Fig. 2

March 4, 1941.  A. F. SHIELDS  2,233,490

AUTOMATIC ADJUSTER

Filed Nov. 25, 1938  4 Sheets-Sheet 3

INVENTOR.
Albert F. Shields
BY
Ostrolenk & Greene
ATTORNEYS

Patented Mar. 4, 1941

2,233,490

UNITED STATES PATENT OFFICE 2,233,490

AUTOMATIC ADJUSTER

Albert F. Shields, Jamaica, N. Y., assignor to
S. & S. Corrugated Paper Machinery Co., Inc.,
Brooklyn, N. Y., a corporation of New York Application November 25, 1938, Serial No. 242,350

18 Claims. (Cl. 164—68)

This invention relates to automatic adjusting mechanisms and more particularly relates to apparatus for automatically changing the cutting cycle of a continuous cutting machine after a predetermined number of sheets have been cut.

The manufacture of stiff board sheets, such as corrugated board is performed in a continuous manner. The sheets are cut to an exact predetermined size by a unit placed at the end of the long formation machine. The cutting machine comprises a pair of cyclically operated knives. The cutting cycle is adjustable to control the length of sheet to be cut from the continuously advancing web.

In the prior art, adjustment of the cutting machine was manually performed by the operator after a predetermined number of sheets of a given size have been cut. Since manufacture of the web is performed at a continuous rate, and the web is fed through the cutting machine, it is most advantageous to reduce the interval of adjustment for the next size to a minimum in order to avoid wastage. The automatic changeover to the next cutting size reduces to a minimum the amount of time required for such change. The automatic adjusting mechanism of my present invention effects a changeover for the next cutting size within thirty seconds after the finish of the previous batch, thus effecting a great saving in the stock.

In accordance with the present invention, I contemplate providing an arrangement for automatically and rapidly adjusting the cutting machine for the next cutting size after a preset number of sheets have been cut. In the preferred form of my invention, I employ a predetermining counter to actuate a relay when a preset number of operations are recorded. The relay energizes a motor control circuit which immediately operates to change the cutting cycle of the cutting machine. The control motor circuit is operative in the proper direction and is stopped when the next predetermined cutting position is reached. Adjustable stop dogs are placed on a scale and are positioned opposite the number indicating the size of sheet desired. The changeover is very accurate and needs no further attention after initial setting.

In a modified form of the invention I employ more than one predetermining counter interlinked to the cyclic mechanism. The operator can thus preset the counter for the amount of cycles to be controlled or sheets to be cut for the period including the size to which the machine is changed over. Thus one counter controls the number of sheets to be cut for the batch being formed and initiates the changeover cycle for the next size of sheet, whereupon a second predetermining counter becomes effective to control the number of sheets to be cut for the changeover position. The operator can thus preset the size as well as number of sheets to be cut for a subsequent batch and leisurely return to reset the mechanism while the second batch is being cut for still another one.

It is accordingly among the objects of the present invention to provide an adjusting mechanism for a cyclically operated machine which automatically changes the cyclic setting of the machine when a predetermined number of cycles have been effected.

Another object of my invention is to provide a mechanism responsive to a predetermined number of cycles of operation to automatically change the cutting length of a cutting machine to another predetermined size of cutting.

Still another object of my invention is to provide automatic changeover mechanism which can be preset for the size of sheet to be cut in a subsequent batch as well as the number of sheets.

A further object of the invention is to provide an automatic adjustment for a continuously operated cyclic cutting machine which changes the adjustment thereof to a second preset cutting size after a given number of sheets have been cut.

These and further objects of the present invention will become apparent in the following description taken in connection with the drawings, in which.

It is to be understood that the automatic adjustment herein described is applicable to any cyclically operated machine which is adjustable for different cyclic periods of operation. The particular cyclic cutting machine illustrated and described is merely for purposes of illustration. Equivalent machines per se may be substituted in combination with the automatic adjuster.

Figure 1:
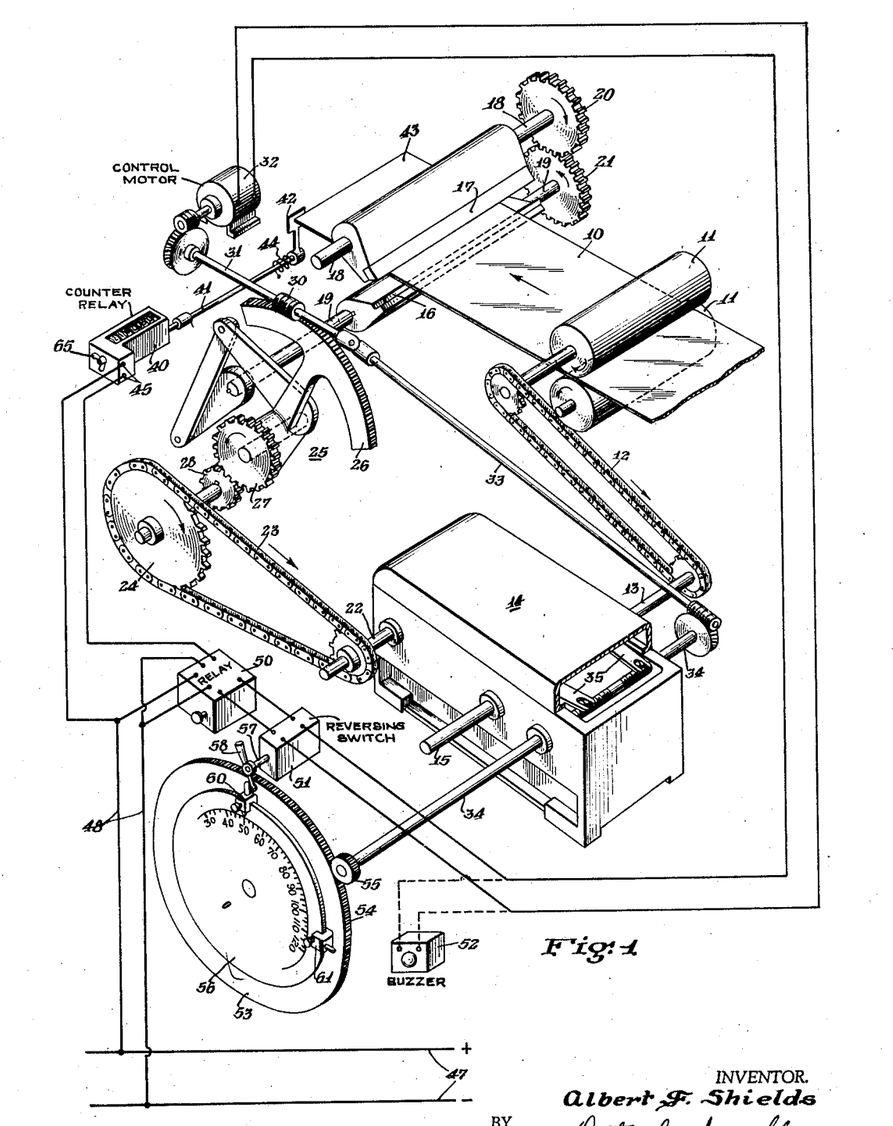
Figure 1 is a perspective illustration of a particular cyclic cutting apparatus in combination with the automatic adjusting mechanism of the invention.

The manufactured sheet material 10 is manufactured as a continuous web from a unit to the right, and is fed in the indicated direction by feed rollers 11 operated at a continuous speed through sprocket drive 12 in the well known manner. The web 10 may be corrugated board, fiberboard or the like. The continuous sprocket drive 12 is driven by shaft 13 of the variable speed drive unit 14. The drive 14 is preferably a Reeves drive arrangement operated from a driver shaft or input 15. The driver shaft 15 is operated at a continuous speed by a synchronous motor or other prime mover not shown. The rate of feed of web 10 through the rollers 11—11 corresponds to the normal feed rate of the web as it is introduced to the cutting unit.

The illustrated cutter is of the rotary type. Cutting blades 16—17 are mounted on respective shafts 18 and 19 and are operated in unison through intermeshing gears 20 and 21. As is well known in the art, the peripheral speed of the knives such as 16—17 preferably equals the rate of advance of the web 10 during the interval of cutting in order to produce a clean cut and avoid buckling or tearing of the sheet by the knives. Furthermore, it is well known that in order to produce a variable length of cut, the remaining portion of the cycle of rotation of the knives 16—17 is adjusted so that its complete cycle of operation corresponds exactly to the length of sheet to be cut, an interval corresponding to the amount of web fed past the cutting position at the normal rate of feed thereof.

There are several known means for variably driving the cutter arrangement 16—17 and adjusting it for different size cuts. In the drawings I have illustrated a preferred arrangement corresponding to that disclosed in my copending applications S. N. 191,060 and S. N. 232,323. Reference is made to these applications for the detailed theory and mode of operation thereof. The operation of the adjusting mechanism for the cutting cycle need accordingly be merely briefly outlined here. The output or driven shaft 22 of the Reeves drive 14 is coupled to sprocket gear 24 through sprocket chain 23. Cyclically operated interlinkage mechanism 25 interconnects the driven sprocket gear 24 and drive shaft 19 of the knife assembly 16—17. Linkage mechanism 25 comprises a segment gear 26 used for variably positioning gear 27 with respect to fixed gear 28. This adjustment is performed by worm gear 30 driven by control shaft 31 through control motor 32. The control shaft 31 is linked to a second control shaft 33 for operating the Reeves drive adjustment shaft 34 geared thereto. Rotation of adjustment shaft 34 alters the position of speed ratio control members 35 of the Reeves drive unit to change the ratio between the speed of the output shaft 22 and the continuous speed input shaft 15 thereof.

By changing the speed ratio setting of the Reeves drive 14 through adjustment shaft 34, the cyclic speed of the cutting mechanism operated through gear 24 is correspondingly changed, the feed rate of the rollers 11—11 remaining constant. Thus, knives 16—17 will engage moving web 10 at a correspondingly increased or decreased number of times per minute. As described in the co-pending applications referred to, the design of the linkage mechanism 25 in conjunction with segment gear 26 is correlated with control shafts 31 and 33 so that for a given change in the cyclic duration of the knives 16—17, an alteration in the cutting cycle characteristic is effected so that the peripheral cutting speed of blades 16—17 during the cutting interval substantially equals the rate of feed of the web 10.

In accordance with my present invention, I provide a predetermining counter relay 40 having an actuating member 41 to operate the counter mechanism once for each cycle of operation of the cutting mechanism 16—17. The illustrated method comprises a trigger 42 arranged to abut the forward edge of the sheet 43 to be cut. After sheet 43 is cut, it is delivered away from the cutter by means not shown in the drawing but well known by those skilled in the art. After the cut sheet is delivered, trigger 42, biased by spring 44, returns to its upright position to be actuated by the forward edge of the advancing sheet. Counter 40 accordingly registers the number of sheets cut.

The invention is naturally not limited to any specific arrangement for registering the cycles of operation of the mechanism to be controlled or adjusted. Thus a cam arrangement between counter member 41 and shafts 18 or 19 of the cutter mechanism may be used instead of the trigger arrangement. It is to be understood that the counter 40 is mechanically connected to register the number of cycles of operation of the unit whose adjustment is to be changed after a predetermined number of the particular cycles is executed. The knives may be of the rotary or reciprocating type.

The counter relay 40 is of the type having an integral relay switch. The counter should be presettable so that the switch will be actuated after a predetermined number is registered on the counter portion of the unit. A unit such as 40 is known in the art as a predetermining counter relay. Reference is made to Patent No. 2,040,027 for a preferred predetermining counter relay construction. The predetermining dials on the counter 40 correspond to the smaller openings 40', the register or counting dials to the larger openings 40''. The predetermining dials 40' are set into the number corresponding to the number of sheets to be cut at a given length; the illustrated number being 2000. The register or counting dials are illustrated as reading 1, 2, 3, and 5, meaning that 1,235 sheets have already been cut of the size to which the machine is set.

Terminals 45 of the counter relay 40 are connected to a mechanically actuated switch 46 internal of the unit 40 as will be later described in connection with Figure 2. When the number on the counting dials 40'' reaches the preset number on the predetermining dials 40', switch 46 is electrically closed or shorted to initiate the electrical control operation upon motor 32 in a manner to be described. A pilot power or direct current line 47 is connected by leads 48 to relay 50. Control motor 32 is circuitally connected with relay 50 and a reversing switch box 51. An electric buzzer or lamp unit 52 may be connected across the motor circuit to inform an attendant that an adjustment of the particular machine is being effected. Thus, when a number of machines are being attended by a single operator, his attention will be directed to the particular machine being adjusted for the next size. He may then further attend the machine to preset it for the number and size of sheets to be produced by the machine for the subsequent job.

The speed ratio adjustment shaft 34 of Reeves drive 14 is extended and connected to a geared disk 53 having a peripheral gear 54. Pinion 55, connected to shaft 34, meshes with gear 54 to motivate disk 53 clockwise or counterclockwise in correspondence with the rotation of shaft 34. Since the rotation of adjustment shaft 34 corresponds to the cyclic change in the knives 16—17 effected through control motor 32, it will be now evident that the particular length of sheet for which the knives are adjusted at a given time can be calibrated. A scale 56 is attached to gear disk 53. The scale is calibrated to show the length of sheet cut in inches. The illustrated machine shows a range of thirty inches to one hundred and twenty inches.

The invention is not limited to any particular type or size of machine. Reversing switch box 51 has a protruding shaft 57 with a trip lever 58 attached thereto. Two stop dogs 60 and 61 are shown adjustably positionable with respect to scale 56. Thumb screws are used for affixing the stop dogs in position opposite a preferred figure on the scale. As will be later explained, stop dogs 60 or 61 deenergizes the control motor circuit when they abut trip lever 58, changing the position of the switch blades within box 51. Thus the adjustment mechanism of my present invention is initiated by the predetermined counter relay 40 after a given number of sheets have been cut, to energize the control motor 32 which changes the length of cut adjustment of the cutter knives 16—17 to the next size of sheet to be cut. The control motor is deenergized when the stop dog secured opposite the next size of sheet desired as indicated on scale 56 trips lever 58.

Figure 2:
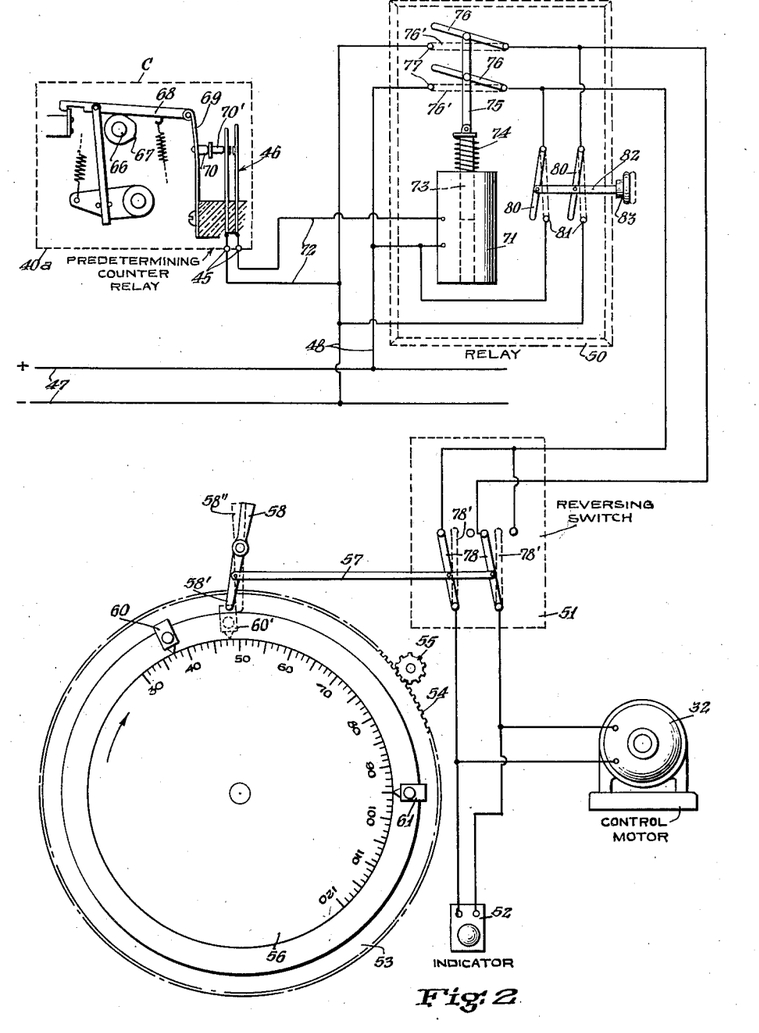
Figure 2 is a schematic electrical diagram of the automatic adjustment of the invention.

In accordance with the embodiment of Figures 1 and 2, the single counter relay 40 is reset after the cutter mechanism 16—17 has been readjusted to the next size of cutting. Predetermining counter 40 is reset by means of wing-nut 65 which is pulled out slightly and turned once around. This operation resets the counting dials 40″ to zero and opens switch 46 connected to terminals 45 in preparation for another control cycle. If a different predetermined number of sheets is to be cut for the batch from that seen on the predetermining dials 40′, the dials are reset during the progress of the cutting. The counter relay 40 of the arrangement of Figure 2 will not be actuated as long as counting dials 40′ do not exceed the reading of the predetermining dials 40′. Similarly a stop dog 60 or 60′ is set opposite the number on the scale 56 corresponding to the size of sheet to be cut in the next batch as will now be evident. The trip lever 58 of switch 51 is moved in a direction corresponding to the direction in which the motor 32 should operate in order to reach the next cutting position, corresponding to whether the next cutting position is smaller or greater than the particular setting of the knives.

Figure 2 is a detail electrical diagram of a preferred circuital arrangement for carrying out the control features of the invention. An end view of the counter mechanism with the wing nut removed to facilitate illustration is shown at 40a and corresponds to Figure 4 of the Patent No. 2,040,027 already referred to. As explained in the patent, the counter carrying shaft 66 has a cam 67 secured thereto for moving transversely disposed latching member 68 when the counting dials 40″ numerically register an amount equal to that set on the predetermining dials 40′. Movement of lever 68 forces spring member 69, pivoted thereto, to close switch 46 by pin 70 and an intermediate pin 70′ reciprocally mounted in a relay casing. Further description of the predetermining counter relay is believed unnecessary in this application in view of the established nature of the device.

Switch 46 is connected in series with the solenoid 71 of relay 50 and the direct current power line 47 by leads 72 and 48. Solenoid 71 contains a plunger 73 mechanically biased outwardly by spring 74. A lever 75 is connected to switch blades 76 normally maintained open from contacts 77 due to the action of spring 74. Switch mechanism 76—77 is connected in series between power line 47 and control motor 32 through reversing switch 51. Reversing switch 51 comprises switch blades 78 mechanically linked with lever 57 to trip lever 58. Switch blades 78 are shown closed upon the switch contacts, towards the left.

In the solidly drawn position of blades 78, current will flow through control motor 32 (when the remainder of the circuit is established to power line 47) in a direction to adjust knives 16—17 for a smaller cycle, and therefore smaller size of sheet cut. This direction of rotation of motor 32 is such as to cause the scale disk 56 containing stop dogs 60 and 61 to move clockwise. The setting of stop dog 60 is shown opposite '37 inches'. The solid position of trip lever 58 is slanted towards stop dog 60, holding switch blades 78 to the indicated solid position. The size of sheet indicated as being cut is '50 inches'.

As the cutting adjustment of knives 16—17 is reduced from the '50 inch' cutting position, stop dog 60 approaches tip 58′ of stop lever 58. When stop dog 60 reaches the dotted position 60′ it abuts tip 58′ and moves lever 58 to the dotted position 58″. Switch blades 78 are thrown to the neutral or open position 78′, shown in dotted. Due to the relatively slow rate of movement of stop dogs 60 and 61, no overshooting of the switch blades 78 normally occurs. As a precaution, an automatic mechanically braked arrangement for motor 32 is used to prevent the possibility of overshooting.

Conversely, when a larger size of sheet is required for the next batch, the switch blades 78 of reversing switch 51 are manually thrown to the extreme right set of contacts so that the direction of current through motor 32 will be opposite to the previous case when the remainder of the circuit to line 47 is completed. In this case, gear disk 53 will move stop dog 61 towards the tip 58′ of trip lever 58 and abut it when the proper adjustment size has been reached to throw switch blades 78 to the opened dotted position.

The control operation proceeds as follows: When switch 46 is closed through the action of counter 40 after a predetermined number of cutting cycles have been effected in the apparatus, solenoid 71 is energized and attracts plunger 73 downwardly against spring 74, thereby closing switch blade 76 upon contact 77. When switch 76 is closed upon contact 77 the circuit between power line 47 and the reversing switch 51 is completed. The reversing switch is manually set to the right or left set of contacts by means of trip lever 58 as already described. The handle or top of lever 58 is pointed in the direction with respect to scale 56 corresponding to the next size of sheet required. The illustrated position of lever 58 shown in solid, corresponds to a direction of rotation of motor 32 to reduce the duration of the cycle of operation of the knives 16—17, correspondingly reducing the size of the sheet to be cut.

When the counting dials 40" reaches 2000, it is equal to the predetermined setting on the preset dials 40'. The predetermining counter relay 40 then causes closure of its switch 46, energizing solenoid 71 to close the electrical circuit to motor 32 through switch blades 76 and 78. Control motor 32 is then continuously energized, rotating control shafts 31 and 33 to change the speed or duration of the cyclic operation of knives 16—17 to shorten it for cutting a smaller size of sheet in the illustrated case. The shortening of the cutting cycle proceeds until stop dog 60 abuts the tip 58' of the stop lever 58 and throws it to the dotted position 58" to open the switch circuit at 78. The current to motor 32 is accordingly interrupted at the instant the proper size adjustment for the cutting blades 16—17 is effected, and remains open until reset.

A buzzer or a light 52 is shown optionally connected in parallel across the motor 32. Thus, as soon as the controlling circuit is energized, the buzzer or lamp 52 is also energized to inform a nearby operator of the condition of the apparatus. A self-locking relay and local battery may be included in the buzzer or lamp unit 52 to maintain its energization even after motor 32 is subsequently deenergized. Thus the operator can leisurely come to the machine during the progress of the next batch to readjust the machine for the next order.

I further provide a switching circuit 80—81 to by-pass the counter relay 40 and solenoid 71 arrangement. Switch 80—81 is connected in series between the output of switch blades 76 and the power line 47. A lever 82 controls the position of switch blades 80 and is manually operable through knob 83 projecting outside of the relay 50 housing. When switch blades 80 are in the position shown, the by-passing circuit 80—81 is opened and has no effect on the remainder of the circuit. However, when knob 83 is pulled outwardly of the unit 50, closing switch circuit 80—81, energy is directly applied to the reversing switch 51 regardless of an open position of switches 46 or 76. The operator can accordingly control the operation of motor 32 independently of the setting or operation of the predetermining counter relay 40. The reversing switch apparatus 51 in conjunction with trip lever 58 can be used to control the duration and direction of rotation of the control motor 32 in a manner similar to that already described. When the apparatus is set for automatic operation by the counter relay 40, knob 83 is pressed inwardly of the unit 50 to open the by-pass circuit 80—81.

Figures 3, 4, 5:
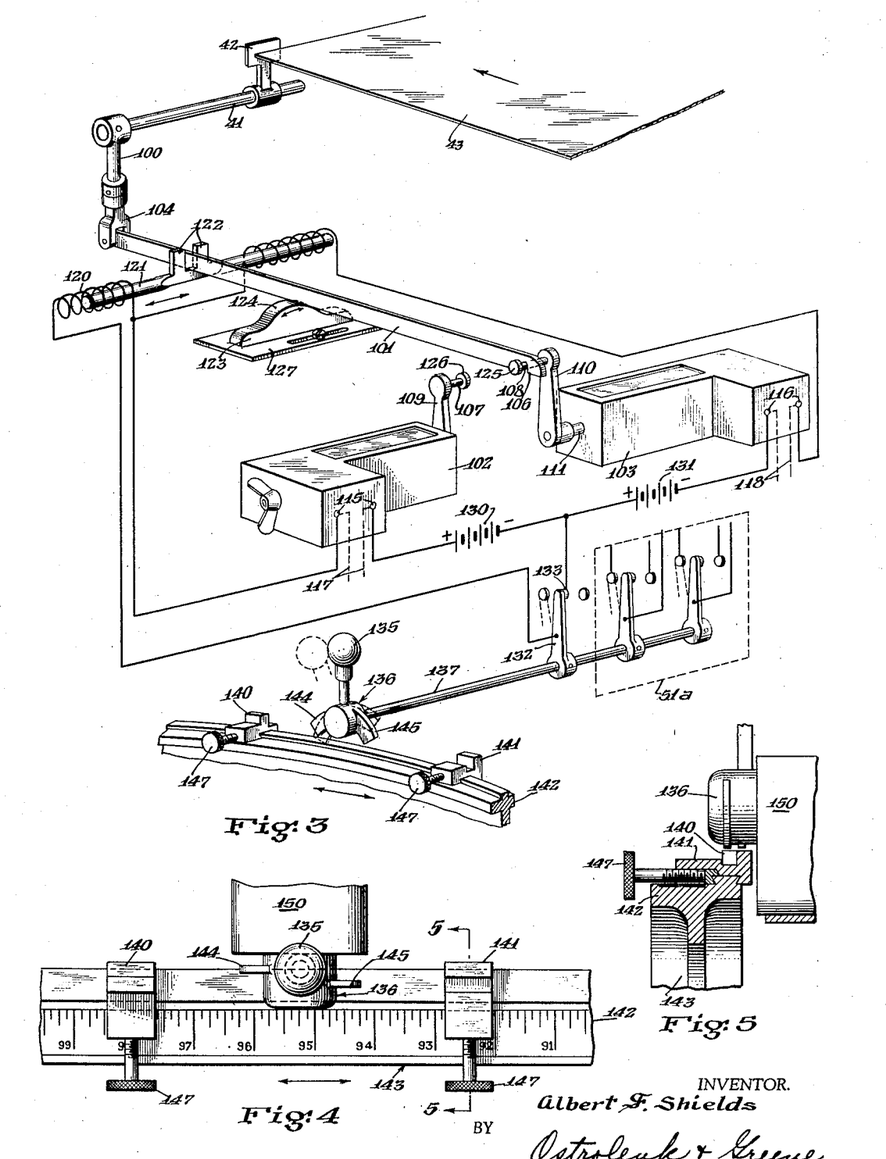
Figure 3 is a schematic representation of a modified form of an automatic adjuster employing two predetermining counters and a modified sheet length pre-setter.
Figure 4 is a plan view of a modified sheet length setting mechanism.
Figure 5 is a cross sectional view taken along 5—5 through the presetting mechanism of Figure 4.

Figure 3 is a schematic representation of a modified arrangement wherein more than one predetermining counter is employed. This arrangement permits the operator to set the counter which is not being used to the number corresponding to the amount of sheets to be cut for the batch after the run is completed. The knives and feeding arrangement for the moving web are omitted from this figure, but it is to be understood that similar mechanism to that shown in Figure 1 or any equivalent mechanism can be used for this purpose.

The forward end 43 of the sheet being cut abuts target 42. Target 42 is secured to shaft 41. Shaft 41 is deflected counterclockwise whenever target 42 is displaced by an advancing sheet. A lever arrangement 100—101 is attached to shaft 41 for actuating either of the predetermining counters 102 and 103. Lever 100 is attached to a fork 104 through a swivel joint 105. Lever 101 is pivoted in the fork member 104.

The forward end 106 of lever 100 has a cutout portion adapted to engage either of pins 107 or 108 respectively projecting from register arms 109 and 110 of the predetermining counters. The illustration shows lever 101 engaged with pin 108 of a predetermining counter 103. When target 42 is deflected by sheet 43, shaft 41 is locked causing pivoted lever 101 to move forward and rock lever 110 of counter 103. Lever 110 is attached to the counter shaft 111 and advances the counter mechanism therein one unit. Counter shaft 111 is spring biased to neutral position by a spring contained within the unit 103. Accordingly, when the cut sheet is delivered, the lever arrangements are restored to the neutral position bringing target 42 up for the next counting actuation.

It is to be understood that the circuits connecting the switch contacts 115 and 116 of the counters 102 and 103 are completed to a relay and other circuit arrangements to the control motor in a manner similar to that already described in connection with Figures 1 and 2. Thus, when either of the counters 102 or 103 reaches the amount preset therein, the circuit to the control motor (not shown in Figure 3) will be completed to initiate change of setting of the knives or other cyclic apparatus. Dotted connections 117 and 118 are indicated for the switch contacts of respective counters 102 and 103 for the circuital connections to the relays, switching mechanism and control motor.

The electrical arrangement in Figure 3 is for automatically switching target 42 from one predetermining counter to the other at the end of a run and coincident with the starting of the next batch. A solenoid 120, having a plunger 121, is employed for mechanically effecting the changeover of lever 101 between pins 107 and 108. Plunger 121 has a forked end 122 engaging lever 101. When plunger 121 is attracted to the left by solenoid 120, lever 101 is drawn over the surface of cam 123. Cam 123 has an intermediate raised portion 124 so that the end 106 of lever 101 is raised over pin 108 to prevent interference with button 125 of the pin. As lever 101 moves to the left over cam 123, the end 106 thereof is moved to engage pin 107. A button 126 at the end of pin 107 prevents lever 101 from sliding off the pin. Cam 123 is mounted on a slidable base 127 for transverse positioning with respect to the counters. Swivel joint 105 permits lever 101 to be deflected by plunger 121 while maintaining its interlinkage with target shaft 41.

The predetermining counters 102 and 103 are similar in all respects to counter 40 described in connection with Figures 1 and 2. Counters 102 and 103 contain switches which are actuated when a preset number is reached by the counter. The switches of counters 102—103 are circuitally arranged to actuate plunger 21 to the right or left so as to throw lever 101 from the counter in service to the next counter in preparation for the next run. The preferred circuit arrangement employs two batteries or sources of energy 130 and 131 individually in circuit with respective switches of the relay counters. Battery 130 is in series with counter 102 through switch terminals 115 thereof, solenoid 120 and switch arm 132.

Battery 131 is similarly in circuit with relay 120 and switch arm 132 except that it includes contacts 116 connecting to the switch internal of counter 103. When switch arm 132 contacts point 133 current will flow through solenoid 20 from either battery 130 or 131, depending upon whether the switch of counter 102 or of 103 is closed. The direction of current flow through solenoid 120 depends upon which of the batteries 130 or 131 is in circuit therewith, the polarity of the batteries being arranged for reverse current effects.

In the normal operation of the system, hand lever 135 of the tripping mechanism 136 is thrown to the right or left in accordance with the required direction of movement of the control motor for reasons already described in connection with trip lever 58 in Figures 1 and 2. The dotted position of handle 135 is shown to the left. The trip mechanism 136 is secured to a drum switch through common shaft 137. The drum switch includes the necessary switching arrangements corresponding to switch 51 of the prior described modifications, as well as switch 132—133 used for the multi-counter arrangement herein shown. Switch arm 132 is accordingly normally thrown to the right or left at the beginning of a run in accordance with the subsequent required direction of rotation of the control motor, which in turn is determined upon the next size of sheet to be cut. When switch arm 132 is thus deflected, the circuit to the solenoid 120 is opened, preventing actuation thereof until switch arm 132 is returned to the central contact point 133. Switch 132 is closed upon contact 133 at the end of the knife adjusting cycle when lever 135 is tripped by the adjustable dog elements.

Dogs 140 and 141 are slidably arranged upon the rim 142 of disk 143 and are adjustably positionable thereon in a manner such as already described in connection with Figures 1 and 2. When disk 143 is rotated in the proper direction, either projection 144 or 145 of trip member 136 is abutted to cause mechanism 136 to return to the vertical or neutral position, shown in solid. When this occurs, the drum switch including switch arm 132 is returned to the vertical position shown, and the circuit to the solenoid is completed. Since either one of the switches within counters 102 or 103 is closed, to initiate the rotation of the control motor of the system and the movement of the disk 143, the closure of switch arm 132 on point 133 initiates the flow of current through solenoid 120 in the proper direction to remove lever 101 from the counter, the switch of which is closed, to the next counter.

The operator sets either of dogs 140 or 141 opposite the position on the scale corresponding to the next size of sheet to be cut by the cutting machine. Handle 135 of trip mechanism 136 is moved in the direction in which the disk 143 is to rotate during the cycle adjusting period. At this time the operator also presets the counter not being employed during that run. The unused counter is preset to the number equalling the sheets to be cut in the next run. Thus, when the changeover is effected at the end of the run, the size of sheet of the new batch is automatically adjusted and a new counter properly preset is put into operation starting from zero on the counter dials to accurately ing cut. The operator accordingly need not rush to adjust the counter but may return to the machine to set it up for a subsequent batch at any time during the progress of the cutting.

Figures 3, 4 and 5 illustrate a modified form of the sheet-size adjusting mechanism. This form permits stop dogs 140 or 141 to move under the projections of the stop lever after the lever is tripped to its vertical or neutral position. Projections 144 and 145 of trip mechanism 136 are displaced transversely. The corresponding projections of stop dogs 140 and 141 coacting therewith are likewise displaced. Grooves in the stop dogs 140—141 are provided to permit passage thereof underneath the projection not associated with the particular stop dog. A thumb screw 147 is provided for each stop dog to lock it in position on rim 142 of disk 143. Drum switch 150 is interlinked with the trip lever mechanism 136 and contains the reversing switch shown at 51a as well as the switching mechanism 132—133.

Figure 6:
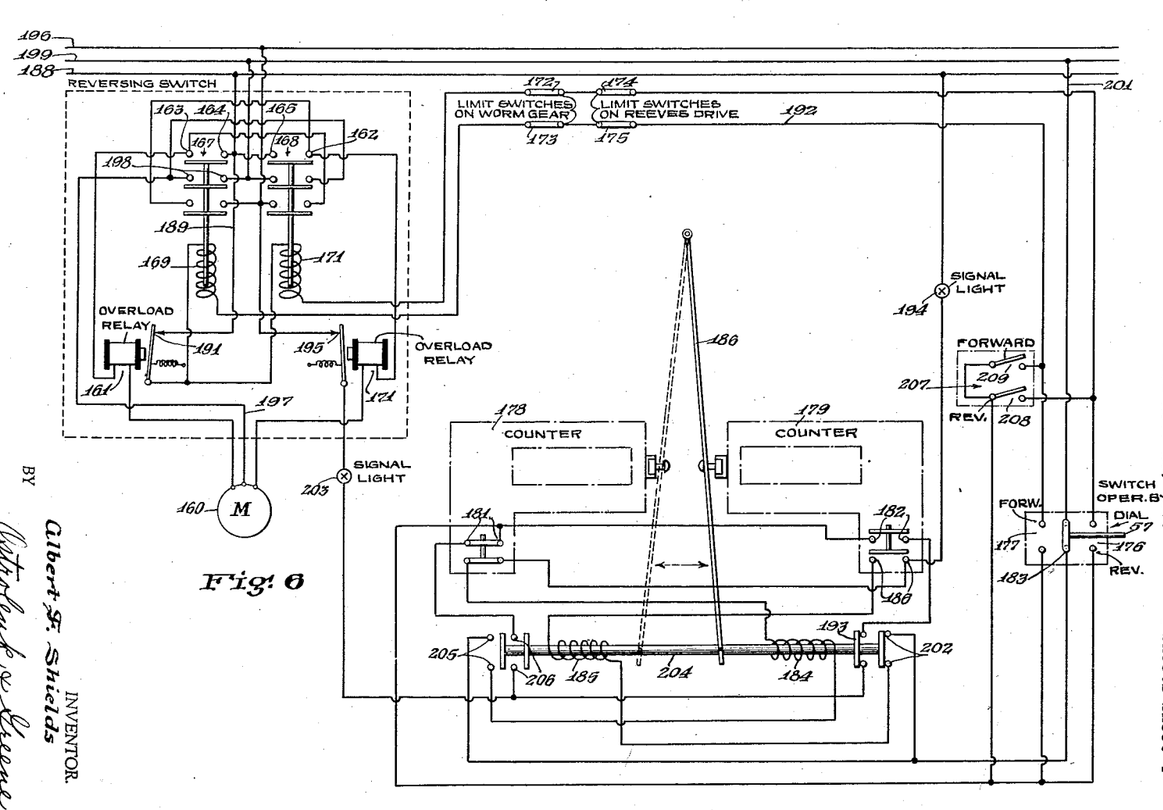
Figure 6 is a circuit diagram of the mechanism employing a plurality of predetermining counters.

In Figure 6 I have shown schematically more of the details of the system of Figure 5 employing a plurality of counters. The alternating current control motor 160 is equivalent to motor 32 of Figure 1 and functions to operate the mechanism for making the necessary adjustment for the different sized sheets and simultaneously opening its own circuit when the adjustment change has been completed. Its energizing circuit is controlled through the overload relays 161 and 171 over the contacts 163, 164, 165 and 162 of the reversing switches 167 and 168, which in turn are controlled by the reversing switch magnets 169 and 171 respectively.

The reversing magnets 169 and 171 are in turn controlled over circuits including the limit switches 172 and 173 on the worm gear and limit switches 174 and 175 on the Reeves, which are opened when a predetermined limit position on the Reeves or worm gear is obtained. The circuits for the reversing magnets 169 and 171 are also controlled by the contacts 176 and 177 on the drum trip switch on the dial driven by motor 160 and corresponding to the dial 56 of Figure 1. As explained hereinbefore when the dial has been driven by the motor 160 to a position corresponding to the new sized sheets to be cut, the trip operates to open these circuits. The circuit for the reversing switch further extends to the counter mechanisms 178 and 179, each having a pair of contacts 181 and 182 respectively.

When it is desired to change the size of sheets being cut, the drum trip switch on the dial is manually operated to close either contacts 176 or 177, depending on whether a larger or smaller sized sheet is desired. At this time nothing happens until the counter mechanism has completed its operation for the sheet then being cut. When, however, the counter has completed the count of sheets being cut, the counter contacts 181 or 182 will close, depending upon which counter is at that time in use, thereby completing the circuit for the reversing switch magnet 169 or 171, as the case may be, to drive the motor to the new position, at which position as has already been explained, the circuit is again open at the contact 176 or 177. When the drum trip switch on the dial is operated from either position 176 or 177 to its neutral position at 183, a circuit will be closed through either the magnet 184 or 185 to switch the electrical circuits from the counter which has just been in use to the counter 186 is operated to mechanically throw the new counter into operation by the sheets, as in the manner shown by the arm 101 in Figure 3.

By this construction it will be apparent that all operations are automatic and foolproof against any accidental operation by the operator of the drum trip switch, for example, to a new position before he has set the counter, as the circuits include not only the drum switch contacts but also the contacts of the counter, as will be made apparent from the detailed description which follows.

In the position counter 179 is at this time in operation counting the sheets being cut. The operator may now set counter 178 for a new number of sheets and may then also manually operate the switch 183 to either contacts 176 or 177 after having set the dial such as 56 to the size of sheet desired. It will be assumed for the present that the change in size is such that he moves it to contacts 177. At this time since counter 179 has not completed its operations nothing will happen. As soon as the number of sheets in the previous operation are completed, counter 179 is operated, causing its upper pair of contacts 182 and its lower pair of contacts 186 to be closed.

A circuit will thereupon be completed for the switch magnet 169 from the power terminal 188, conductor 189, switch terminals 191, the winding of magnet 169, through the limit switches 173 on the worm gear and limit switches 175 on the Reeves, over the conductor 192 and through the contacts 177 on the drum trip switch, and the contacts 182 of the counter in series therewith, through the closed contacts 193, signal light 203, contacts 195 of the overload relay, and back to the terminal of the power supply 196. Energization of the magnet 169 will close the contacts of switch 167, thereby completing a circuit from the terminal of the power supply 198, over the contacts 164 and 163 of switch 167, through the winding of the overload relay 161, through the motor winding 160 and back over conductor 197 and through the contacts 198 of the switch 167 to the terminal 199 of the power supply line. The other circuits of the three phase motor will be self apparent and need not be traced here.

The motor is thereupon driven operating the length adjustment mechanism and also opening the contacts at 177 as soon as the adjustment has reached the proper position, all as shown in detail in Figure 1. As soon as the contacts 177 are open, the energizing circuit for the magnet 169 is opened, which in turn permits the restoration of the switch 167 to its open position in the usual manner, thereby deenergizing the motor 160, which is thereupon brought to a stop.

The drum trip switch has now moved from contact 187 to the contacts 183, completing a circuit for the solenoid magnet 185 which is thereupon energized over a circuit from the power supply line 199, conductor 201, through the drum trip switch contacts 183, over the contacts 202, through the solenoid 185, contacts 186, the signal light 194, and back to the power supply line 188. The energization of the solenoid 185 will operate the plunger 204 to the left, opening the contacts 193 and 202 and closing the contacts 205 and 206. Contacts 206 when closed prepare the circuit for one of the magnets 169 or 171 of the switches 167 and 168 respectively when this circuit is completed by the counter 178 which is now in operation for the new size and when the drum trip switch is again moved to either its position 177 or 176 as the case may be. At this time the contacts at 181, however, of the counter 178 are open as has already been explained, since this counter has been set now for cutting a predetermined number of the new sized sheets. The contacts 205, in turn, have prepared an energizing circuit for the solenoid 184 when the counter has completed its operation and the drum trip switch for a new setting has been restored from its preset position. At the same time the operation of the plunger 204 has also operated the lever 186 so as to set the counter 178 into operation by the sheets, as described more specifically in connection with the lever 101, Figure 3. It will be noted that under no circumstances can a change in the adjustment be effected to a new size by operation of the motor 160 until the previous number of sheets has operated the counter then in use to close its associated contacts.

In the meanwhile the adjacent counter may be prepared for another such change in size. The cutter may now continue to operate indefinitely on the previously set size of sheet until a change is desired. In the event that the drum trip switch is moved to change the size of sheet after the counter has operated for the previous size, operations as described above will take place immediately on such switching operation since the contacts of the counter will then be in position preparatory for such circuits.

Provision is also made by means of the hand operated switch 207 for manually closing circuits for driving the motor 160 independently of the drum trip switch should this operation be desirable, this being accomplished by means of the contacts 208 and 209 which shunt the contacts 176, and the contacts 209 which shunt the contacts 177.

In the above I have disclosed modified forms which my invention may assume in practise. It is to be understood that modifications are feasible in carrying out the invention without departing from the broader spirit and scope thereof as defined in the following claims in which equivalent structures are to be understood for the various elements recited therein.

I claim:

1. The combination with mechanism having rotatably mounted cutting knives for cyclically cutting a moving web into successive sheets of a predetermined size and apparatus for changing the cyclic adjustment of said mechanism for cutting a different size of sheet of: a counter having an associated element which is actuated when the counter registers a preset amount; a device for operating said counter in accordance with the cutting operations of said mechanism, and means responsive to an actuation of said element for operating said apparatus until the next predetermined cyclic adjustment is effected.

2. The combination with mechanism having rotatably mounted cutting knives for cyclically cutting a moving web into successive sheets of a predetermined size and apparatus for changing the cyclic adjustment of said mechanism for cutting a different size of sheet of: a counter having an associated element which is actuated when the counter registers a preset amount; a device for operating said counter in accordance with the cutting operations of said mechanism, and a member displaceable in accordance with the operation of said apparatus, an element movable on said member for predetermining the degree of cyclic adjustment on said mechanism by said apparatus, a trip lever arranged for abutment by said element during the operation of said apparatus, and means associated with said trip lever for stopping the operation of said apparatus when said element abuts the lever.

3. The combination with mechanism having rotatably mounted cutting knives for cyclically cutting a moving web into successive sheets of a predetermined size and apparatus for changing the cyclic adjustment of said mechanism for cutting a different size of sheet including an electric control motor of: a predetermining counter having an associated switch which is actuated when the counter registers a preset amount; a device for operating said counter in accordance with the cutting operations of said mechanism, and means responsive to an actuation of said switch for operating said apparatus until the next predetermined cyclic adjustment is effected including electrical circuit connections between said switch and said motor.

4. The combination with mechanism having rotatably mounted cutting knives for cyclically cutting a moving web into successive sheets of a predetermined size and apparatus for changing the cyclic adjustment of said mechanism for cuting a different size of sheet including an electric control motor of: a predetermining counter having an associated switch which is actuated when the counter registers a preset amount; a device for operating said counter in accordance with the cutting operations of said mechanism, and means responsive to an actuation of said switch for operating said apparatus until the next predetermined cyclic adjustment is effected including electrical circuit connections between said switch and said motor, a trip lever, a member for abutting said lever when said predetermined cyclic adjustment is reached, and means operable by said lever to deenergize said motor when said lever is abutted by said member.

5. The combination with mechanism having rotatably mounted cutting knives for cyclically cutting a moving web into successive sheets of a predetermined size and apparatus for changing the cyclic adjustment of said mechanism for cutting a different size of sheet including an electric control motor of: a predetermining counter having an associated switch which is actuated when the counter registers a preset amount; a device for operating said counter in accordance with the cutting operations of said mechanism, and a member displaceable in accordance with the operation of said apparatus, an element movable on said member for predetermining the degree of cyclic adjustment on said mechanism by said apparatus, a trip lever arranged for abutment by said element during the operation of said apparatus, and means associated with said trip lever for stopping the operation of said apparatus when said element abuts the lever including a second switch in circuit with said motor for opening the motor circuit.

6. The combination with mechanism having rotatably mounted cutting knives for cyclically cutting a moving web into successive sheets of a predetermined size and apparatus for changing the cyclic adjustment of said mechanism for cutting a different size of sheet of: a counter having an associated element which is actuated when the counter registers a preset amount; a device for operating said counter in accordance with the cutting operations of said mechanism, a member displaceable in accordance with the operation of said apparatus, a scale on said member calibrated in accordance with the degree of cyclic adjustment corresponding to the displacement of said member, an element movable on said member and guided by said scale for predetermining the degree of cyclic adjustment on said mechanism by said apparatus, a trip lever arranged for abutment by said element during the operation of said apparatus, and means associated with said trip lever for stopping the operation of said apparatus when said element abuts the lever.

7. In a cutting machine for cutting sheet material, said machine having cyclically operable cutting means, means for feeding a continuous web to said cutting means at a constant rate, means for regulating the period of operation of the cutting means to produce sheets of selected length; and means for automatically changing the period of operation of the cutting means to produce sheets of another selected length in accordance with a predetermined setting of the apparatus.

8. In a cutting machine for cutting sheet material, said machine having cyclically operable cutting means, means for feeding a continuous web to said cutting means at a constant rate, means for regulating the period of operation of the cutting means to produce sheets of selected length; and an adjustment apparatus for changing the period of operation of the cutting means to produce sheets of another selected length; means for setting said adjustment apparatus, and means for initiating the operation of said adjustment apparatus means for automatically halting the operation of said adjustment apparatus upon reaching the selected setting.

9. In a cutting machine for cutting sheet material, said machine having cyclically operable cutting means, means for feeding a continuous web to said cutting means at a constant speed; means for regulating the period of operation of the cutting means to produce sheets of selected length, said means including a Reeves drive and adjusting mechanism for cyclically varying the speed of the cutting means; an electric control motor for changing the adjustment of said Reeves drive and said adjusting mechanism; means to initiate the operation of the electric control motor, and means operable upon the reaching of a pre-set adjustment of the Reeves drive and the mechanism to halt the operation of the electric control motor.

10. A cutting machine for cutting a continuous web of sheet material into a plurality of sheets each having a selected length, said machine having cyclically operable cutting means, means for feeding a continuous web to said cutting means at a constant speed, adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set adjustment; and means operable upon the reaching of the pre-set adjustment to halt the operation of the electric control motor.

11. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a switch in circuit with said motor, said switch being normally closed, a trip lever for operating said switch, a member for operating the trip lever, said member being driven by said electric control motor while the adjustment is being effected thereby, said member being arrangeable at a plurality of settings between the limits of adjustment possible for the adjustable members, each setting of said member corresponding to a specific length; said member being engageable with said trip lever and opening said switch and halting said electric control motor when the pre-set length setting is reached.

12. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a switch in circuit with said motor, said switch being normally closed, a trip lever for operating said switch, a member for operating the trip lever, said member being driven by said electric control motor while the adjustment is being effected thereby, said member being arrangeable at a plurality of settings between the limits of length adjustment possible for the adjustable members, each setting of said member corresponding to a specific setting of said adjustable members; said members being engageable with said trip lever and opening said switch and halting said electric control motor when the pre-set length is reached; said switch being closable by operation of said trip lever after said trip lever operating member is moved to another selected adjustment.

13. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a switch in circuit with said motor, said switch being normally closed, a trip lever for operating said switch, a member for operating the trip lever, said member being driven by said electric control motor while the adjustment is being effected thereby, said member being arrangeable at a plurality of settings between the limits of length adjustment possible for the adjustable members, each setting of said member corresponding to a specific setting of said adjustable members; said member being engageable with said trip lever and opening said switch and halting said electric control motor when the pre-set length is reached, said switch being closable by operation of said trip lever after said trip lever operating member is moved to another selected adjustment, said electric control motor being a reversible motor, said switch being a reversing switch, said switch being selectively arrangeable in position to cause the motor to arrange the adjustable members to decrease or increase the length of sheet to be cut in accordance with the setting of the trip-lever operating member.

14. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means operable to initiate the operation of the electric control motor to effect an adjustment in a pre-set direction to a pre-set length; and means operable upon the reaching of the pre-set length to halt the operation of the electric control motor, said last mentioned means comprising a member displaceable in accordance with the operation of said adjustment apparatus, a scale on said member calibrated in accordance with the degree of adjustment of said member; an element movable on said member and guided by said scale for predetermining the degree of adjustment of said machine by said adjusting apparatus, a trip lever arranged for abutment by said element during the operation of said apparatus, and means associated with said trip lever for stopping the operation of said apparatus when said element abuts said lever.

15. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a member displaceable in accordance with the operation of said adjusting apparatus, an element movable on said member for predetermining the degree of adjustment of said adjusting apparatus, a trip lever arranged for abutment by said element during the operation of said adjusting apparatus, and means associated with said trip lever for stopping the operation of said apparatus when said element abuts the lever.

16. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a switch in circuit with said motor, said switch being normally closed, a trip lever for operating said switch, a member for operating the trip lever, said member being driven by said electric control motor while the adjustment is being effected thereby said member being arrangeable at a plurality of settings between the limits of adjustment possible for the adjustable members, each setting of said member corresponding to a specific setting of said adjustable members; said member being engageable with said trip lever and opening said switch and halting said electric control motor when the pre-set adjustment is reached, said switch being closable by operation of said trip lever after said trip lever operating member is moved to another selected adjustment.

17. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a switch in circuit with said motor, said switch being normally closed, a trip lever for operating said switch, said trip lever being actuated upon the reaching of the pre-set length adjustment.

18. A cutting machine for cutting a continuous web of sheet material into a plurality of sheets each having a selected length, said machine having cyclically operable cutting means, means for feeding a continuous web to said cutting means at a constant speed; adjustable members for regulating the period of operation of the cutting means to produce sheets of selected length; an electric control motor connected to and operable upon said adjustable members for changing the setting thereof to change the length of the sheets to be cut; means to initiate the operation of the electric control motor to effect an adjustment in a pre-set direction to a pre-set length; and means operable upon the reaching of the pre-set length to halt the operation of the electric control motor, said last mentioned means comprising a switch in circuit with said motor, said switch being normally closed, a trip lever for operating said switch, means driven by said motor while the adjustment is being effected thereby to actuate said trip lever upon the reaching of the pre-set length adjustment.

ALBERT F. SHIELDS.